(12) United States Patent
McCormick et al.

(10) Patent No.: US 8,911,811 B2
(45) Date of Patent: Dec. 16, 2014

(54) METHOD OF OPERATING A COFFEE MAKER

(75) Inventors: Arren J. McCormick, Benton Harbor, MI (US); Ben C. Shao, Stevensville, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 267 days.

(21) Appl. No.: 13/337,571

(22) Filed: Dec. 27, 2011

(65) Prior Publication Data

US 2013/0164422 A1 Jun. 27, 2013

(51) Int. Cl.
*A47J 31/00* (2006.01)

(52) U.S. Cl.
USPC .......................................... 426/433; 426/520

(58) Field of Classification Search
USPC ................................. 426/433, 520
See application file for complete search history.

(56) References Cited

U.S. PATENT DOCUMENTS

| | | | |
|---|---|---|---|
| 4,015,749 A | 4/1977 | Arzberger et al. | |
| 4,608,916 A | 9/1986 | Becker | |
| 4,667,587 A * | 5/1987 | Wunder | 99/295 |
| 4,977,819 A | 12/1990 | Lorenz | |
| 5,980,965 A | 11/1999 | Jefferson | |
| 6,339,985 B1 | 1/2002 | Whitney | |
| 6,672,200 B2 | 1/2004 | Duffy et al. | |
| 6,843,164 B2 | 1/2005 | Drobeck | |
| 7,089,849 B2 | 8/2006 | Chen et al. | |
| 7,223,427 B2 | 5/2007 | Knepler | |
| 7,278,349 B2 | 10/2007 | Grant et al. | |
| 7,673,557 B2 | 3/2010 | Bienvenu et al. | |
| 7,861,646 B2 | 1/2011 | Bockbrader | |
| 8,056,468 B2 * | 11/2011 | De'Longhi | 99/285 |
| 2009/0020017 A1 * | 1/2009 | Lin et al. | 99/284 |
| 2009/0229471 A1 | 9/2009 | Lun | |
| 2010/0011964 A1 | 1/2010 | White | |
| 2010/0154645 A1 * | 6/2010 | Nosler et al. | 99/281 |
| 2011/0100228 A1 * | 5/2011 | Rivera | 99/281 |

FOREIGN PATENT DOCUMENTS

| | | | |
|---|---|---|---|
| DE | 3307338 A1 | | 9/1984 |
| DE | 3705430 A1 | | 9/1988 |
| DE | 102010023668 | * | 12/2010 |
| JP | 6-343559 | * | 12/1994 |
| NL | 1002420 C2 | | 8/1997 |
| WO | 2010031665 A2 | | 3/2010 |

* cited by examiner

*Primary Examiner* — Anthony Weier

(57) ABSTRACT

A coffee maker and method of operating the same is shown. The method includes deactivating a heating plate of the coffee maker when a drip pan is positioned thereon, soliciting a user-selection of a serving size from a plurality of serving sizes when the drip pan is positioned on the base, and operating a pump of the coffee maker to advance fluid to a filter basket in accordance with the selected serving size.

12 Claims, 11 Drawing Sheets

METHOD OF OPERATING A COFFEE MAKER

CROSS-REFERENCE TO RELATED U.S. PATENT APPLICATIONS

Cross-reference is made to co-pending U.S. Utility patent application Ser. No. 13/337,534 entitled "COFFEE MAKER SUPPORTING SINGLE SERVING AND MULTIPLE SERVING OPERATION," which was filed on Dec. 27, 2011, and co-pending U.S. Utility patent application Ser. No. 13/337,508 entitled "COFFEE MAKER WITH DRIP STOP SUPPORTING SINGLE SERVE & CARAFE OPERATION," which was filed on Dec. 27, 2011, each of which is expressly incorporated herein by reference.

TECHNICAL FIELD

The present disclosure relates generally to domestic appliances and more particularly to a coffee maker.

BACKGROUND

A coffee maker is a domestic appliance used to brew coffee or heat water for consumption. Many coffee makers include a pump, a boiler, and electronics to control the operation of the pump and the boiler. Coffee makers may brew multiple servings of coffee during a single operation. Many coffee makers also include a carafe or other vessel to receive the brewed coffee.

SUMMARY

According to one aspect of the disclosure, a coffee maker includes a base, a heating plate located in the base, a filter basket positioned above the heating plate, a drip pan to be positioned on the base, a sensor operable to detect the drip pan when the drip pan is positioned on the base and generate an electrical output signal indicative thereof, and an electronic controller electrically coupled to the heating plate and the sensor. The controller includes a processor, and a memory device electrically coupled to the processor, the memory device having stored therein a plurality of instructions which, when executed by the processor, cause the processor to communicate with the sensor to determine whether the drip pan is positioned on the base, and deactivate the heating plate when the drip pan is positioned on the base.

In some embodiments, the sensor may be a magnetic sensor. In some embodiments, the coffee maker may include a pump electrically coupled to the electronic controller. The pump may be operable to advance fluid to the filter basket. The coffee maker also may include a user interface electrically coupled to the electronic controller that is operable to receive user input and generate an electrical output signal indicative thereof. The memory device may have stored therein a plurality of instructions which, when executed by the processor, cause the processor to prompt a user to select via the user interface a serving size from a plurality of serving sizes when the drip pan is positioned on the base, and operate the pump in accordance with a selected serving size.

In some embodiments, the coffee maker may include a carafe configured to be selectively positioned on the base, and the memory device may have stored therein a plurality of instructions which, when executed by the processor, cause the processor to activate the heating plate when the drip pan is absent from the base.

Additionally, in some embodiments, the memory device may have stored therein a plurality of instructions which, when executed by the processor, cause the processor to prompt the user to select via the user interface a number of multiple servings when the carafe is positioned on the base, and operate the pump in accordance with a selected number of multiple servings. In some embodiments, the coffee maker of claim 4 may further include a drip stop assembly including a lever and a plug secured thereto, the lever being movable relative to the filter basket between a first position in which the plug is positioned in an outlet of the filter basket such that fluid is prevented from advancing through the outlet, and a second position in which the plug is spaced apart from the outlet of the filter basket such that fluid is permitted to advance through the outlet. The drip pan is below a lower end of the lever when the drip pan is positioned on the base.

In some embodiments, the drip stop assembly may further include a spring having a first end secured to the filter basket and a second end secured to the lever. The spring may bias the lever into the first position. In some embodiments, the coffee maker may further include a housing extending upwardly from the base and having the filter basket coupled thereto. The lever may include a first arm pivotably coupled to the housing and a second arm pivotably coupled to the filter basket, the second arm having the plug secured thereto.

According to another aspect, a method of operating a coffee maker includes deactivating a heating plate located in a base of the coffee maker when a drip pan is positioned on the base, soliciting a user-selection of a serving size from a plurality of serving sizes when the drip pan is positioned on the base, and operating a pump to advance fluid to a filter basket in accordance with the user-selection. In some embodiments, the method may further include communicating with a sensor to determine whether the drip pan is positioned on the base.

Additionally, in some embodiments, the sensor may be a magnetic sensor. In some embodiments, the method may further include soliciting a user-selection of a number of multiple servings when the drip pan is absent from the base. In some embodiments, the method may include activating the heating plate when a carafe is positioned on the base.

According to another aspect, a method of operating a coffee maker includes determining whether a drip pan is positioned on a base of the coffee maker and generating a pan-present signal in response thereto, operating a user-interface to display a plurality of serving sizes in response to generation of the pan-present signal, receiving a user-selection of one serving size of the plurality of serving sizes, and operating a pump to advance fluid to a filter basket in accordance with the user-selection. In some embodiments, the method may further include deactivating a heating plate located in the base in response to generation of the pan-present signal.

According to another aspect, a coffee maker includes a base, a filter basket positioned above the base that includes an outlet, and a drip stop assembly coupled to the filter basket. The drip stop assembly includes a plug movable relative to the filter basket between a first position in which the plug is positioned in the outlet of the filter basket such that fluid is prevented from advancing through the outlet, and a second position in which the plug is spaced apart from the outlet of the filter basket such that fluid is permitted to advance through the outlet. The coffee maker also includes a removable single-serve adaptor configured to be selectively positioned on the base. The removable single-serve adaptor includes a drip pan, and an upper arm that contacts the plug such that the plug is positioned in the second position when the removable single-serve adaptor is positioned on the base.

In some embodiments, a chamber may be defined between the upper arm of the removable single-serve adaptor and the drip pan. The chamber may be sized to receive a coffee cup. Additionally, in some embodiments, the coffee maker may further include a carafe configured to be selectively positioned on the base, and the removable single-serve adaptor may have a removed position in which the removable single-serve adaptor is spaced apart from the base, and the carafe is positioned on the base. In some embodiments, when the carafe is positioned on the base, the carafe may engage the plug such that the plug is positioned in the second position.

Additionally, in some embodiments, the removable single-serve adaptor may include an adaptor base including the drip pan, a housing extending upwardly from the adaptor base, and the upper arm extending outwardly from the housing substantially parallel to the base. In some embodiments, the upper arm may have a slot defined therein that is positioned below the outlet of the filter basket.

In some embodiments, the coffee maker may include a heating plate located in the base, and a sensor operable to detect the removable single-serve adaptor when the removable single-serve adaptor is positioned on the base and generate an electrical output signal indicative thereof. The coffee maker may also include an electronic controller electrically coupled to the heating plate and the sensor. The controller may include a processor and a memory device electrically coupled to the processor. The memory device may have stored therein a plurality of instructions which, when executed by the processor, cause the processor to communicate with the sensor to determine whether the removable single-serve adaptor is positioned on the base, and deactivate the heating plate when the removable single-serve adaptor is positioned on the base. In some embodiments, the sensor may be a magnetic sensor.

In some embodiments, the coffee maker may include a pump electrically coupled to the electronic controller, the pump being operable to advance fluid to the filter basket, and a user interface electrically coupled to the electronic controller. The user interface may be operable to receive user input and generate an electrical output signal indicative thereof. The memory device may have stored therein a plurality of instructions which, when executed by the processor, cause the processor to prompt a user to select via the user interface a serving size from a plurality of serving sizes when the removable single-serve adaptor is positioned on the base and operate the pump in accordance with a selected serving size.

In some embodiments, the memory device may have stored therein a plurality of instructions which, when executed by the processor, cause the processor to activate the heating plate when the removable single-serve adaptor is absent from the base.

According to another aspect, the coffee maker may include a base, a heating plate attached to the base, a filter basket positioned above the base, and a removable single-serve adaptor to be selectively positioned on the base over the heating plate. The removable single-serve adaptor includes a drip pan. The coffee maker also includes a sensor operable to detect the removable single-serve adaptor when the removable single-serve adaptor is positioned on the base and generate an electrical output signal indicative thereof, and an electronic controller electrically coupled to the heating plate and the sensor. The controller includes a processor and a memory device electrically coupled to the processor, and the memory device has stored therein a plurality of instructions which, when executed by the processor, cause the processor to communicate with the sensor to determine whether the removable single-serve adaptor is positioned on the base, and deactivate the heating plate when the removable single-serve adaptor is positioned on the base.

In some embodiments, the coffee maker may further include a user interface electrically coupled to the electronic controller, and the user interface operable to receive user input and generate an electrical output signal indicative thereof. The memory device may have stored therein a plurality of instructions which, when executed by the processor, cause the processor to prompt a user to select via the user interface a serving size from a plurality of serving sizes when the removable single-serve adaptor is positioned on the base.

Additionally, in some embodiments, the coffee maker may further include a carafe configured to be selectively positioned on the base in contact with the heating plate. In some embodiments, the memory device may have stored therein a plurality of instructions which, when executed by the processor, cause the processor to activate the heating plate when the removable single-serve adaptor is absent from the base.

In some embodiments, the coffee maker may further include a drip stop assembly coupled to the filter basket, the drip stop assembly including a plug movable relative to the filter basket between a first position in which the plug is positioned in an outlet of the filter basket such that fluid is prevented from advancing through the outlet, and a second position in which the plug is spaced apart from the outlet of the filter basket such that fluid is permitted to advance through the outlet. When the removable single-serve adaptor is positioned on the base, the removable single-serve adaptor may engage the plug to position the plug in the second position.

According to another aspect, a coffee maker includes a base, a filter basket positioned above the base includes an outlet, and a removable single-serve adaptor configured to be selectively positioned on the base. The removable single-serve adaptor includes a drip pan and a chamber sized to receive a coffee cup. The coffee maker also includes a carafe configured to be selectively positioned on the base, and a sensor operable to detect the removable single-serve adaptor on the base.

According to another aspect, a coffee maker includes a base, a filter basket positioned above the base that includes an outlet, a removable carafe configured to be selectively positioned on the base, and a drip stop assembly coupled to the filter basket. The drip stop assembly includes a plug movable relative to the filter basket between a first position in which the plug is positioned in the outlet of the filter basket such that fluid is prevented from advancing through the outlet, and a second position in which the plug is spaced apart from the outlet of the filter basket such that fluid is permitted to advance through the outlet. The coffee maker also includes a funnel configured to engage the plug. When the funnel is engaged with the plug, the plug is in the second position, and the carafe is prevented from being positioned on the base.

In some embodiments, the funnel may be moveably coupled to the filter basket. The funnel may be moveable between a first funnel position in which the funnel is disengaged from the plug and the carafe is permitted to be positioned on the base, and a second funnel position in which the funnel is engaged with the plug and the carafe is prevented from being positioned on the base.

Additionally, in some embodiments, the filter basket may include a pair of tracks, and the funnel may include a pair of rails. Each rail may be positioned in a corresponding track of the filter basket and configured to slide along the corresponding track.

In some embodiments, the funnel may be configured to be removably coupled to the filter basket. In some embodiments, the funnel may be configured to threadingly engage the filter basket.

According to another aspect, a coffee maker includes a base, a filter basket positioned above the base that includes an outlet, a removable carafe configured to be selectively positioned on the base, and a funnel configured to be secured to the filter basket below the outlet. The funnel is sized such that the carafe is prevented from being positioned on the base when the funnel is secured to the filter basket. In some embodiments, the coffee maker may further include a drip stop assembly coupled to the filter basket.

The drip stop assembly may include a plug movable relative to the filter basket between a first position in which the plug is positioned in the outlet of the filter basket such that fluid is prevented from advancing through the outlet, and a second position in which the plug is spaced apart from the outlet of the filter basket such that fluid is permitted to advance through the outlet. When the funnel is secured to the filter basket, the plug may be in the second position.

In some embodiments, the drip stop assembly may include a spring that biases the plug in the first position. In some embodiments, the filter basket may include a bottom wall having the outlet defined therein, and a port extending downwardly from the bottom wall. The port may have the plug positioned therein, and the funnel may be configured to be coupled the port.

In some embodiments, the port may include an externally-threaded outer surface, and the funnel may include an internally-threaded inner surface configured to engage the externally-threaded outer surface of the port. Additionally, in some embodiments, the funnel may include a conical body having an opening defined therein.

According to another aspect, a coffee maker includes a base, a filter basket positioned above the base that includes an outlet, a removable carafe configured to be selectively positioned on the base, and a funnel moveably coupled to the filter basket. The funnel is moveable between a first funnel position in which the carafe is permitted to be positioned on the base, and a second funnel position in which the carafe is prevented from being positioned on the base.

In some embodiments, the filter basket may have a pair of tracks defined therein, and the funnel may include a pair of rails. Each rail may be positioned in a corresponding track of the filter basket and configured to slide along the corresponding track.

Additionally, in some embodiments, the coffee maker may include a drip stop assembly coupled to the filter basket. The drip stop assembly may include a plug movable relative to the filter basket between a first position in which the plug is positioned in the outlet of the filter basket such that fluid is prevented from advancing through the outlet, and a second position in which the plug is spaced apart from the outlet of the filter basket such that fluid is permitted to advance through the outlet. When the funnel is in the second funnel position, the plug may be in the second position.

In some embodiments, the drip stop assembly may include a spring that biases the plug in the first position.

BRIEF DESCRIPTION OF THE DRAWINGS

The detailed description particularly refers to the following figures, in which.

DETAILED DESCRIPTION OF THE DRAWINGS

Figure 1:
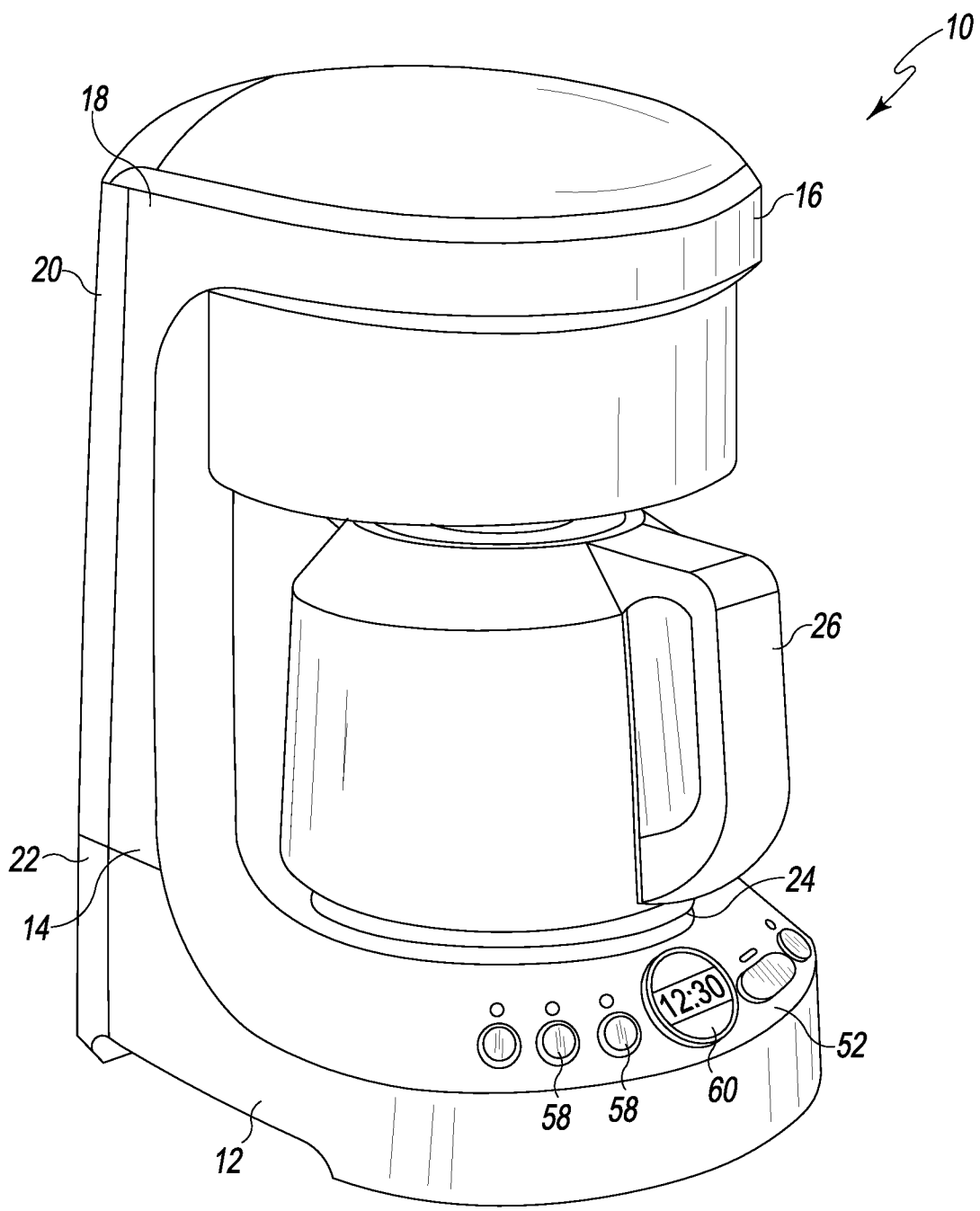
FIG. 1 is a perspective view of one embodiment of a coffee maker with a carafe positioned thereon.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

Referring to FIG. 1, a coffee maker appliance 10 (hereinafter "coffee maker 10") is shown. The coffee maker 10 has a base 12 and a housing 14 extending upwardly from the base 12. The housing 14 has a support arm 16 that extends outwardly from an upper end 18 parallel to the base 12. A fluid tank 20 is removably secured to the housing 14 and positioned above the back end 22 of the base 12. It will be appreciated that in other embodiments the tank 20 may be integral with the housing 14 and the base 12. The base 12 also includes a platform 24 positioned under the arm 16. As shown in FIGS. 1-5, the platform 24 selectively receives a carafe 26 or a drip pan 28.

Figure 2:
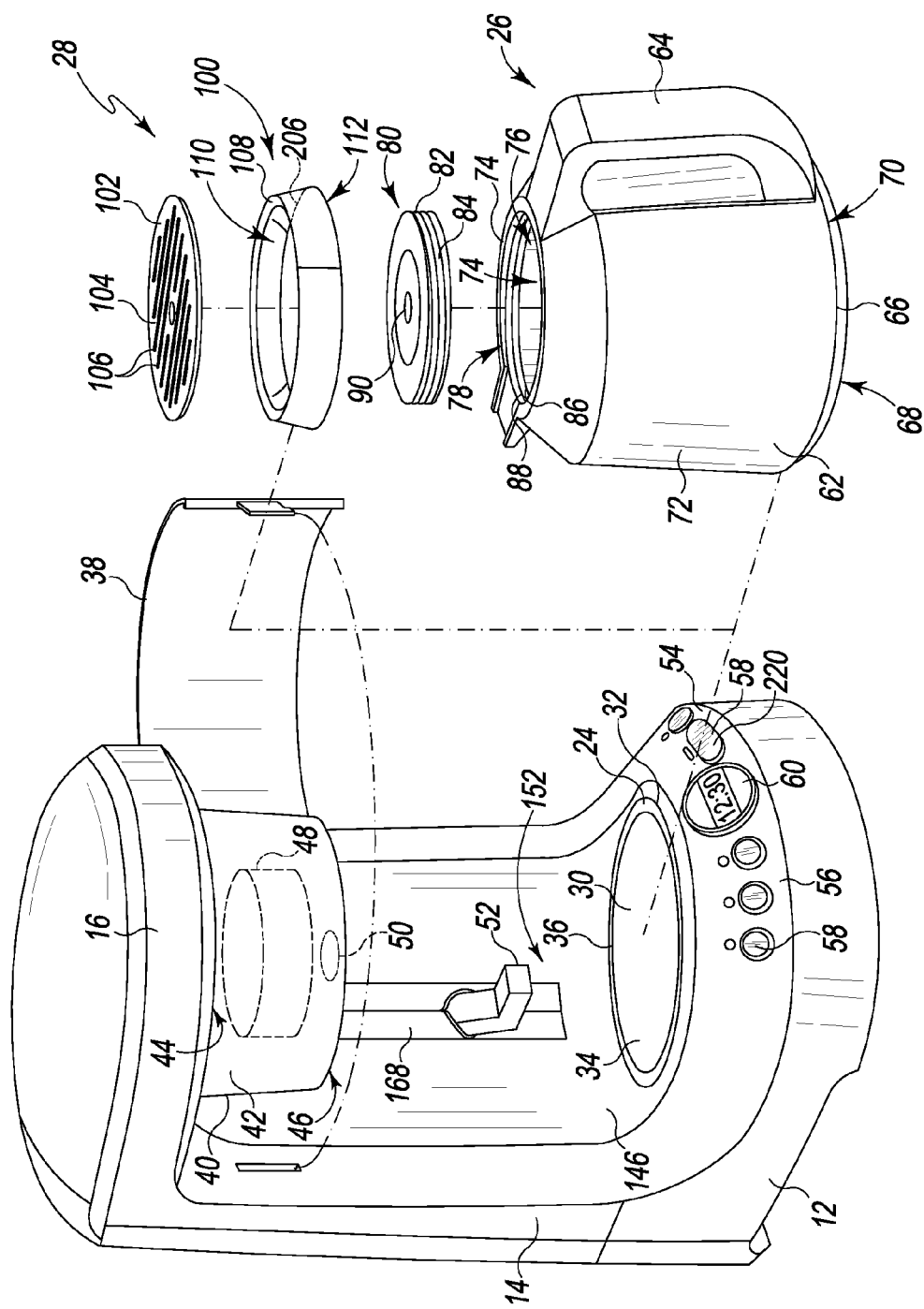
FIG. 2 is an exploded perspective view of the coffee maker of FIG. 1 with the carafe and a drip pan removed.

Referring now to FIG. 2, the coffee maker 10 is shown with the carafe 26 removed from the platform 24. A warming or heating plate 30 is positioned in the upper surface 32 of the platform 24. The heating plate 30 has a heating surface 34 defined by an outer ring 36. As will be described in greater detail below, the heating plate 30 is configured to supply heat to the carafe 26 when the carafe 26 is positioned on the platform 24.

The housing 14 includes a door 38 hinged to one side thereof that permits access to a filter basket 40 positioned above the heating plate 30. The filter basket 40 includes a side wall 42 secured to a lower surface 44 of the arm 16. In the illustrative embodiment, the filter basket 40 is configured to be detached from the support arm 16, but it should be appreciated that in other embodiments the filter basket 40 may be fixed to the support arm 16.

The side wall 42 of the basket 40 extends upwardly from a bottom wall 46, and the walls 42, 46 define a filter chamber (not shown) sized to receive a coffee filter 48. The coffee filter 48 is sized to receive coffee grounds for use in brewing coffee. The bottom wall 46 of the basket 40 has an outlet 50 defined therein, which is positioned below the coffee filter 48. As shown in FIG. 2, the outlet 50 has a substantially circular cross-section. It should be appreciated that in other embodiments the cross-section of the outlet 50 may take the form of a rectangle, square, or other geometric shape. Additionally, it should be appreciated that in other embodiments the basket 40 may have more than one outlet defined therein.

During a brewing operation, fluid may be advanced from the tank 20. After being heated, fluid may be advanced to the filter basket 40 and through any coffee grounds positioned in coffee filter 48. Fluid may then be advanced out the outlet 50 into the carafe 26 or other receptacle positioned below the outlet 50. As will be described in greater detail below, the coffee maker 10 includes a drip stop assembly 52 that is configured to regulate the flow of fluid out of the outlet 50.

A user-interface embodied as a control pad 54 is located at the front end 56 of the base 12. The control pad 54 includes a number of control buttons 58 and a liquid crystal display ("LCD") screen 60, which are used to control the operation of the coffee maker 10. Each of the control buttons 58 is coupled to a control switch (not shown) operable to generate an electrical output signal when the user presses the corresponding button 58. In other embodiments, the user interface may include physical switches, touch sensors, knobs, or other appropriate user input devices to enable the user to control the operation of the coffee maker 10. It will also be appreciated that in other embodiments the user interface may be positioned on the housing 14 or the arm 16.

As shown in FIGS. 1 and 2, the carafe 26 is configured to be selectively positioned on the heating plate 30 of the coffee maker 10. The carafe 26 includes a body 62 having a handle 64 secured thereto. The body 62 is formed from a metallic material but in other embodiments may be made from glass. The body 62 has a stepped bottom wall 66 including a lower surface 68 and a flange surface 70. When the carafe 26 is positioned on the platform 24, the lower surface 68 contacts the heating surface 34 and the flange surface 70 contacts the ring 36 of the heating plate 30. A side wall 72 extends upwardly from the bottom wall 66 to a rim 74 of the body 62. The walls 66, 72 define a fluid container 76, and the rim 74 defines an opening 78 of the fluid container 76.

The carafe 26 has a lid 80 that is configured to be positioned over the opening 78, thereby enclosing the container 76. As shown in FIG. 2, the lid 80 is configured to be removably secured to the body 62. External threads 82 are defined on an outer surface 84 of the lid 80. An inner surface 86 of the body 62 has internal threads 88 defined therein that correspond to the external threads 82. The internal threads 88 threadingly engage the external threads 82 of the lid 80 to secure the lid 80 to the body 62 of the carafe 26.

An inlet 90 is defined in the lid 80. When the carafe 26 is positioned on the heating plate 30, the inlet 90 us positioned below the outlet 50 of the filter basket 40. In that way, fluid exiting the basket 40 through the outlet 50 may advance into the fluid container 76 through the inlet 90. It will be appreciated that in other embodiments the lid 80 may include more than one inlet positioned proximate to the outlet 50 to permit fluid to advance into the fluid container 76.

As discussed above, the coffee maker 10 includes the drip pan 28, which is also configured to be selectively positioned on the heating plate 30. The drip pan 28 includes a shell 100 and a cover grate 102 configured to be secured to the shell 100. The shell 100 is formed from a plastic material while the cover grate 102 is formed from a metallic material. It will be appreciated that in other embodiments the shell 100 may be formed from a metallic material, and the cover grate 102 may be formed from a rigid plastic capable of holding the weight of a coffee mug filled with coffee.

The grate 102 has a planar body 104 and a plurality of slots 106 are defined through the planar body 104. The shell 100 has an upper rim 108 configured to receive the planar body 104 of the grate 102. A bowl-shaped chamber 110 is defined in the shell 100, extending downwardly from the rim 108. The shell 100 of the drip pan 28 also includes a lower surface 112 configured to be placed in contact with the surface 32 of the platform 24.

Figure 3:
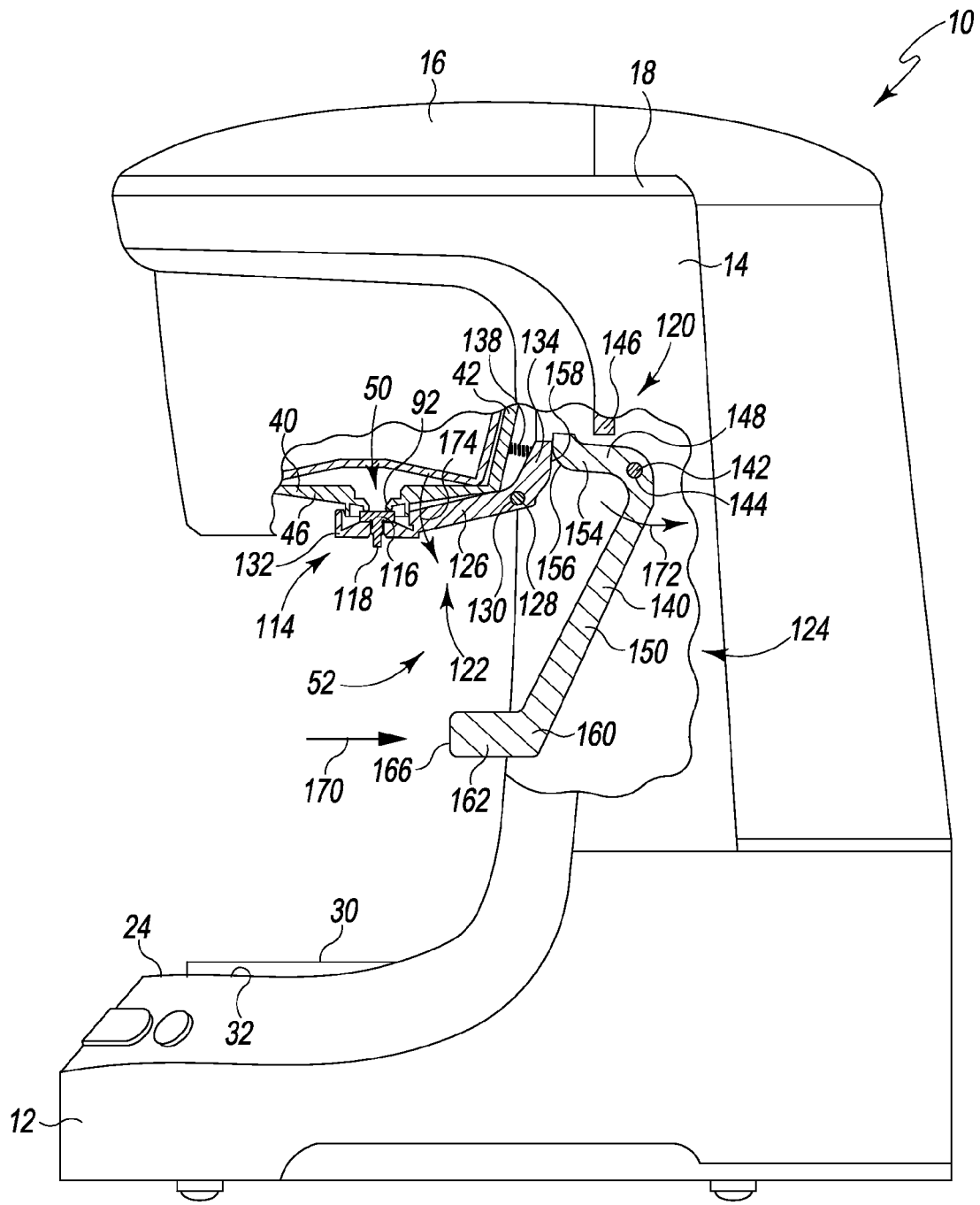
FIG. 3 is a cross-sectional side elevation view of the coffee maker of FIG. 1.
Figure 4:
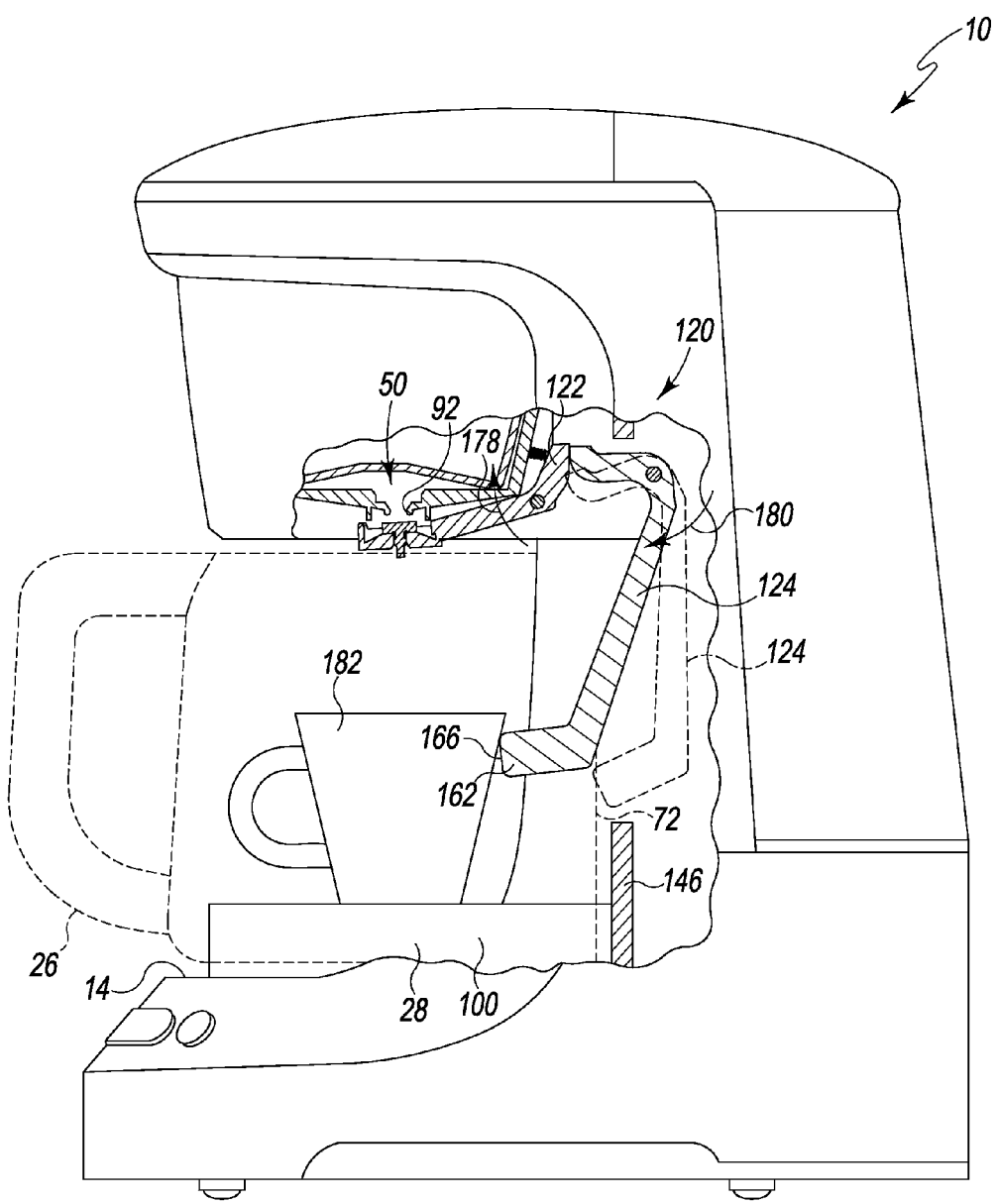
FIG. 4 is another cross-sectional side elevation view of the coffee maker of FIG. 1.

Referring now to FIGS. 3 and 4, the drip stop assembly 52 of the coffee maker 10 is shown in greater detail. The drip stop assembly 52 includes a plug 114 that is sized to substantially seal the outlet 50 of the filter basket 40. In that way, when the plug 114 is positioned as shown in FIG. 3, the plug 114 prevents fluid from advancing through the outlet 50. As shown in FIG. 4, the plug 114 may be spaced apart from the outlet 50 such that fluid is permitted to advance through the outlet 50.

The plug 114 of the drip stop assembly 52 includes a cover plate 116 and a stem 118 extending downwardly from the cover plate 116. The cover plate 116, like the outlet 50, has a substantially circular cross-section. As shown in FIG. 3, the basket 40 includes a rim surface 92 that defines the outlet 50, and the cover plate 116 is configured to engage the rim surface 92 to close the outlet 50. The plate 116 and the stem 118 of the plug 114 are formed as a single integral component from an elastomeric material, such as, for example, a rubber or a soft plastic material. It should be appreciated that in other embodiments the plate 116 and the stem 118 may be formed from different materials and may be joined together during assembly.

As shown in FIG. 3, the drip stop assembly 52 includes a lever assembly 120 that is operable to change the position of the plug 114 relative to the outlet 50. The lever assembly 120 includes an upper lever arm 122 that is secured to the stem 118 of the plug 114 and a lower lever arm 124. The upper lever arm 122 has a body 126 that is attached to the filter basket 40 via a joint 128. The joint 128 includes a cylindrical pin 130 extending from the body 126 of the lever arm 122. The cylindrical pin 130 is received in a pair of holes (not shown) defined in the filter basket 40. The upper lever arm 122 may be pivoted about the joint 128 between a closed position (see FIG. 3) and an open position (see FIG. 4). In the closed position, the plug 114 engages the rim surface 92 of the basket 40 such that fluid is prevented from advancing through the outlet 50; in the open position, the plug 114 is spaced apart from the outlet 50 such that fluid is permitted to advance therethrough.

The body 126 of the upper lever arm 122 has a lower end 132 positioned adjacent to the outlet 50 of the filter basket 40 and an upper end 134 positioned along the sidewall 42 of the filter basket 40. As shown in FIG. 3, the stem 118 of the plug 114 is received in an aperture defined in the lower end 132 of the body 126 of the lever arm 122. A biasing element, illustratively embodied as a spring 138, is positioned between the upper end 134 of the body 126 and the sidewall 42 of the basket 40 and is configured to bias the upper lever arm 122 in the closed position, as shown in FIG. 3.

The lower lever arm 124 of the lever assembly 120 has a body 140 that is attached to the housing 14 of the coffee maker 10 via a joint 142. The joint 142 includes a cylindrical pin 144 extending from the body 140 of the lever arm 124. The cylindrical pin 144 is received in a pair of holes (not shown) defined in the housing 14, thereby permitting the lower lever arm 124 to pivot about the joint 142 relative to the housing 14.

As shown in FIG. 3, the body 140 of lower lever arm 124 that is partially positioned behind a rear wall 146 of the housing 14. The body 140 has an arm branch 148 and another arm branch 150 that extends at an angle relative to the branch 148. The arm branch 148 extends through an opening 152 defined in the rear wall 146, and the arm branch 148 has an end 154 configured to contact the upper lever arm 122. In the illustrative embodiment, the end 154 of the branch 148 includes a cam surface 156. When the filter basket 40 is attached to the support arm 16 of the coffee maker 10 as shown in FIG. 3, the cam surface 156 of the arm branch 148 engages an angled rear surface 158 of the upper lever arm 122 at the upper end 134 thereof.

The other arm branch 150 of the lower lever arm 124 extends downwardly from the arm branch 148 to a lower end 160. The lever assembly 120 also includes a button 162 extending from the lower end 160 of the arm branch 148. The button 162 extends through a lower end of the opening 152 defined in the rear wall 146 and has a front face 166 positioned above the upper surface 32 of the platform 24. As shown in FIG. 2, a pair of covers 168 is secured to the rear wall 146 to enclose the opening 152, and the lower lever arm 124 and the button 162 extend outwardly through the seam defined between the covers 168. In the illustrative embodiment, the covers 168 are formed from a polymeric material that is semi-flexible.

As described above, the lever assembly 120 of the drip stop assembly 52 may be utilized to change the position of the plug 114 relative to the outlet 50 of the basket 40. To do so, the user may place the carafe 26 on the platform 24 to depress the button 162, as shown in FIG. 4. When the button 162 is depressed, the button 162 is moved along the path indicated by arrow 170. The movement of the button 162 causes the lower lever arm 124 to pivot about the joint 142 in the direction indicated by arrow 172. As the lower lever arm 124 pivots about the joint 142, the cam surface 156 of the arm branch 148 slides downwardly along the angled rear surface 158 of the upper lever arm 122. The downward movement of the cam surface 156 along the angled rear surface 158 causes the upper lever arm 122 to pivot about the joint 128 in the direction indicated by arrow 174. As the upper lever arm 122 is pivoted about the joint 128, the spring 138 is compressed between the upper end 134 of the upper lever arm 122 and the sidewall 42 of the filter basket 40. The plug 114 is also moved away from the outlet 50 to the open position shown in FIG. 4. As described above, fluid is permitted to advance through the outlet 50 into the carafe 26 when the drip stop assembly 52 is in the open position.

When the carafe 26 is removed from the platform 24, the spring 138 urges the upper lever arm 122 to pivot about the joint 128 in the direction indicated by arrow 178, and the upper lever arm 122 moves from the open position shown in FIG. 4 back to the closed position shown in FIG. 3. As the upper lever arm 122 pivots about the joint 128 as indicated by arrow 178, the cam surface 156 of the arm branch 148 slides upwardly along the angled rear surface 158 of the upper lever arm 122, thereby causing the lower lever arm 124 to pivot about the joint 142 in the direction indicated by arrow 180. As the lower lever arm 124 pivots about the joint 142 as indicated by arrow 180, the button 162 advances out of the housing 14 to the position shown in FIG. 3.

The button 162 may also be depressed by a coffee cup 182, as shown in FIG. 4. When the drip pan 28 is positioned on the platform 24, the button 162 is positioned above the drip pan 28 and may be depressed by, for example, the cup 182. As shown in FIG. 4, when the cup 182 is placed on the drip pan 28 below the outlet 50, the cup 182 engages the front face 166 of the button 162. The contact between the cup 182 and the button 162 causes the lever arms 122, 124 to pivot about their respective joints 128, 142. As described above, the movement of the lever arms 122, 124 causes the plug 114 to move away from the outlet 50 to another one of the open positions. In the illustrative embodiment, the cup 182 causes the lever assembly 120 to actuate less than the carafe 26. It should be appreciated that larger cups may cause the lever assembly 120 to actuate more.

It should be appreciated that in other embodiments the drip stop assembly 52 may include additional assemblies or other components to change the position of the plug 114 relative to the outlet 50. It should also be appreciated that the upper lever arm 122 of the drip stop assembly 52 may be attached to another part of the coffee maker 10, such as, for example, the housing 14 or the support arm 16. Additionally, it should be appreciated that the joints 128, 142 may include other structures to pivotally couple the lever arms 122, 124 to the basket 40 and housing 14, respectively. Those structures may include, for example, one or more tabs secured to the bodies 126, 140 and corresponding openings, apertures, or holes defined in the basket 40 and housing 14.

Figure 5:
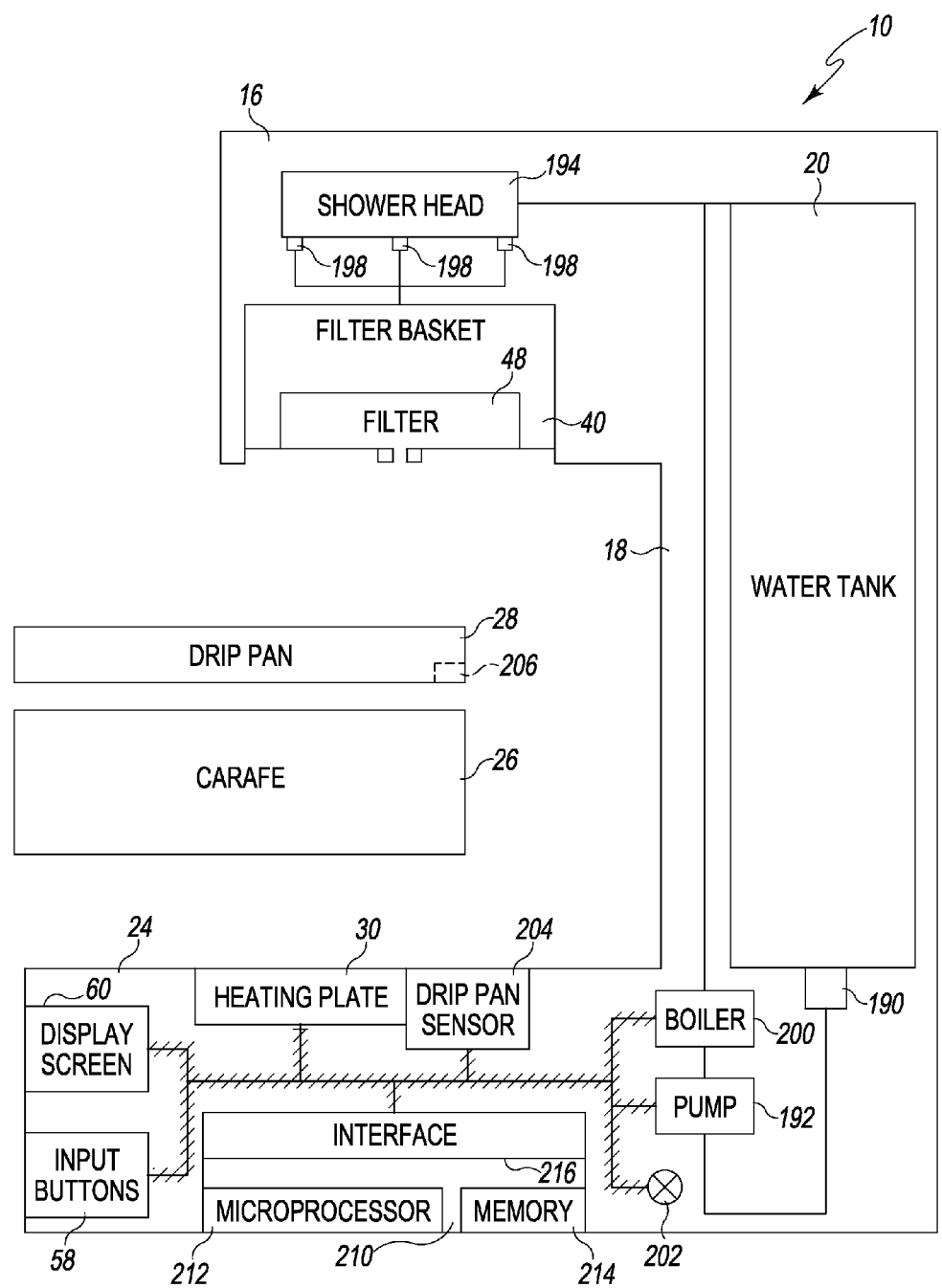
FIG. 5 is a simplified block diagram of the coffee maker of FIG. 1.

Referring now to FIG. 5, the coffee maker 10 is shown in a simplified block diagram. The tank 20 includes an outlet 190 connected to a pump 192 that is operable to advance fluid from the tank 20 to a shower head 194 positioned above the filter basket 40. The shower head 194 includes a plurality of outlets 198 configured to spray fluid onto the filter 48 (and hence onto coffee grounds contained therein) positioned in the basket 40.

A boiler 200 is positioned between the pump 192 and the shower head 194. A control signal may selectively activate the boiler 200 to heat fluid advancing from the tank 20 to the shower head 194. In operation, the pump 192 is selectively energized to supply fluid from the tank 20 to the boiler 200. The boiler 200 heats fluid passing therethrough before the fluid is advanced to the shower head 194.

A fluid sensor 202 is positioned between the pump 192 and the tank 20 to monitor fluid advancing from the tank 20. As embodied in FIG. 5, the fluid sensor 202 is a flow sensor that provides an indication of the quantity of fluid advanced from the tank 20 and generates an electrical output signal indicative of that quantity. It should be appreciated that in other embodiments the sensor 202 may be a rotary potentiometer, a Hall effect sensor, or any other sensor operable to provide an indication of the quantity of fluid advancing from the tank 20.

The coffee maker 10 also includes a drip pan sensor 204 positioned in the base 12. As embodied in FIG. 5, the drip pan sensor 204 is a magnetic sensor that provides an indication of the presence of the drip pan 28 on the heating plate 30 of the base 12. In the illustrative embodiment, the drip pan 28 includes a rim 206 (see FIG. 2) formed from a metallic material. Because the rim 206 is formed from a metallic material, the sensor 204 is operable to detect the rim 206 when the drip pan 28 is positioned on the platform 24 and generate an electrical output signal indicative of the presence of the drip pan 28. It will be appreciated that in other embodiments the sensor 204 may be any type of reed switch, curtain switch, plum switch, pressure switch, or any other type of electrical or mechanical switch operable to detect the presence of the drip pan 28 on the platform 24.

The coffee maker 10 also includes an electronic control unit (ECU) or "electronic controller" 210. The electronic controller 210 may be positioned in the base 12 or in the housing 14 of the coffee maker 10. The electronic controller 210 is, in essence, the master computer responsible for interpreting electrical signals sent by sensors associated with the coffee maker 10 and for activating or energizing electronically-controlled components associated with the coffee maker 10. For example, the electronic controller 210 is configured to control operation of the various components of the coffee maker 10, including the pump 192 and the boiler 200. The electronic controller 210 also monitors various signals from the control pad 54, the fluid sensor 202, the drip pan sensor 204, etc. The electronic controller 210 also determines when various operations of the coffee maker 10 should be performed. As will be described in more detail below with reference to FIG. 6, the electronic controller 210 is operable to control the components of the coffee maker 10 such that the coffee maker 10 may switch between a single serving mode and multiple serving mode and solicit user input regarding coffee maker operation to adjust operational parameters of the coffee maker 10 in response thereto.

To do so, the electronic controller 210 includes a number of electronic components commonly associated with electronic units utilized in the control of electromechanical systems. For example, the electronic controller 210 includes, amongst other components customarily included in such devices, a processor such as a microprocessor 212 and a memory device 214 such as a programmable read-only memory device ("PROM") including erasable PROM's (EPROM's or EEPROM's). The memory device 214 is provided to store, amongst other things, instructions in the form of, for example, a software routine (or routines) which, when executed by the microprocessor 212, allows the electronic controller 210 to control the operation of the coffee maker 10.

The electronic controller 210 also includes an analog interface circuit 216. The analog interface circuit 216 converts the output signals from various sensors (e.g., the drip pan sensor 204) into signals which are suitable for presentation to an input of the microprocessor 212. In particular, the analog interface circuit 216, by use of an analog-to-digital (A/D) converter (not shown) or the like, converts the analog signals generated by the sensors into digital signals for use by the microprocessor 212. It should be appreciated that the A/D converter may be embodied as a discrete device or number of devices, or may be integrated into the microprocessor 212. It should also be appreciated that if any one or more of the sensors associated with the coffee maker 10 generate a digital output signal, the analog interface circuit 216 may be bypassed.

Similarly, the analog interface circuit 216 converts signals from the microprocessor 212 into output signals which are suitable for presentation to the electrically-controlled components associated with the coffee maker 10 (e.g., the pump 192). In particular, the analog interface circuit 216, by use of a digital-to-analog (D/A) converter (not shown) or the like, converts the digital signals generated by the microprocessor 212 into analog signals for use by the electronically-controlled components associated with the coffee maker 10. It should be appreciated that, similar to the A/D converter described above, the D/A converter may be embodied as a discrete device or number of devices, or may be integrated into the microprocessor 212. It should also be appreciated that if any one or more of the electronically-controlled components associated with the coffee maker 10 operate on a digital input signal, the analog interface circuit 216 may be bypassed.

Thus, the electronic controller 210 may control the operation of the coffee maker 10 in accordance with the user-selected brewing cycle. In particular, the electronic controller 210 executes a routine including, amongst other things, a control scheme in which the electronic controller 210 monitors the outputs of the sensors associated with the coffee maker 10 to control the inputs to the electronically-controlled components associated therewith. To do so, the electronic controller 210 communicates with the sensors associated with the coffee maker 10 to determine, amongst numerous other things, the presence of the drip pan 28 and the amount of fluid advanced from the tank 20. Armed with this data, the electronic controller 210 performs numerous calculations, either continuously or intermittently, including looking up values in preprogrammed tables, in order to execute algorithms to perform such functions as determining when to energize the pump 192 to advance fluid to the shower head 194, determining when to de-energize the pump 192 to prevent too much fluid from advancing from tank 20, generating the contents of the screen 60, and so on.

Figure 6:
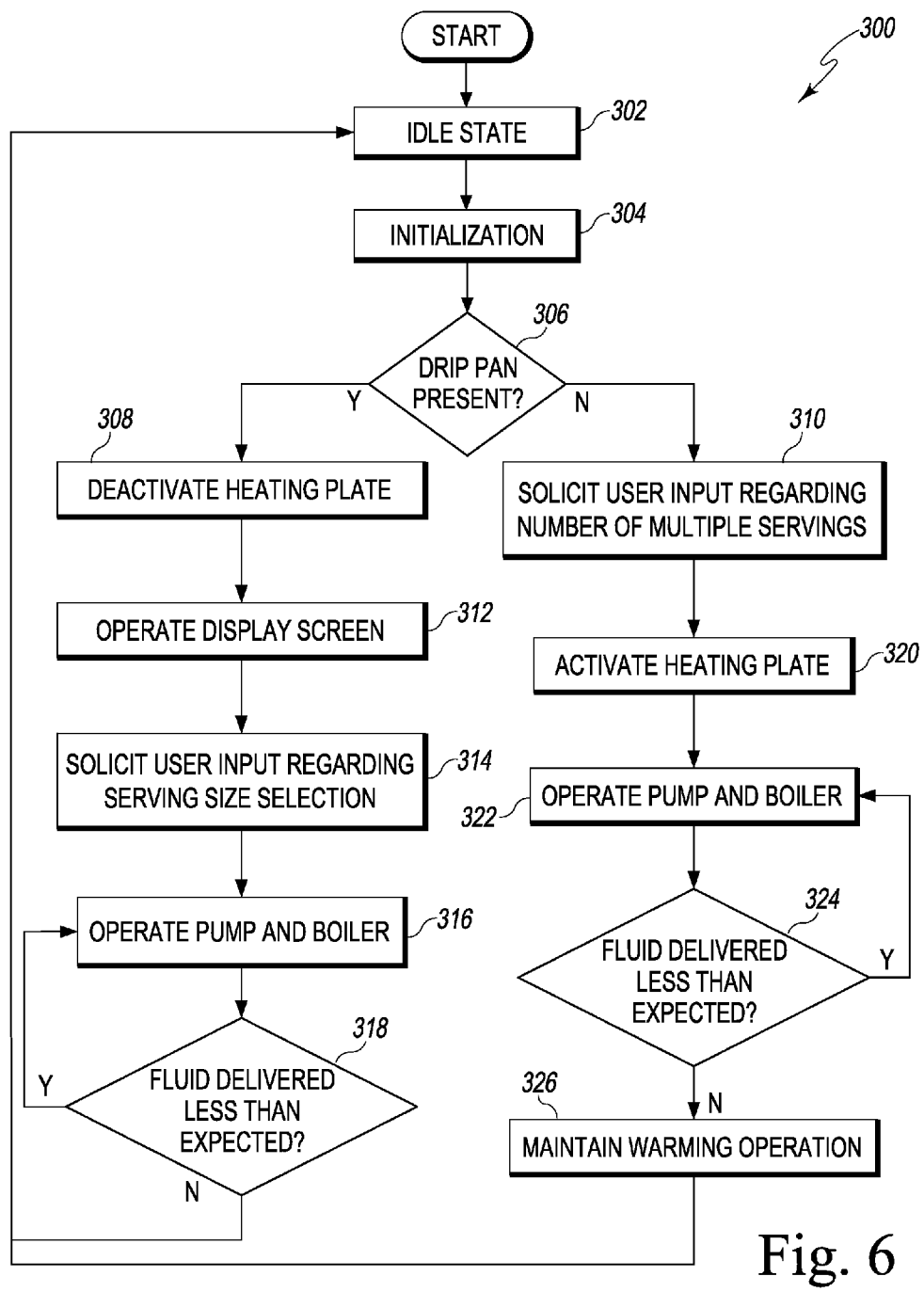
FIG. 6 is a simplified flow chart of a control routine for operating the coffee maker of FIG. 1.
Figure 7:
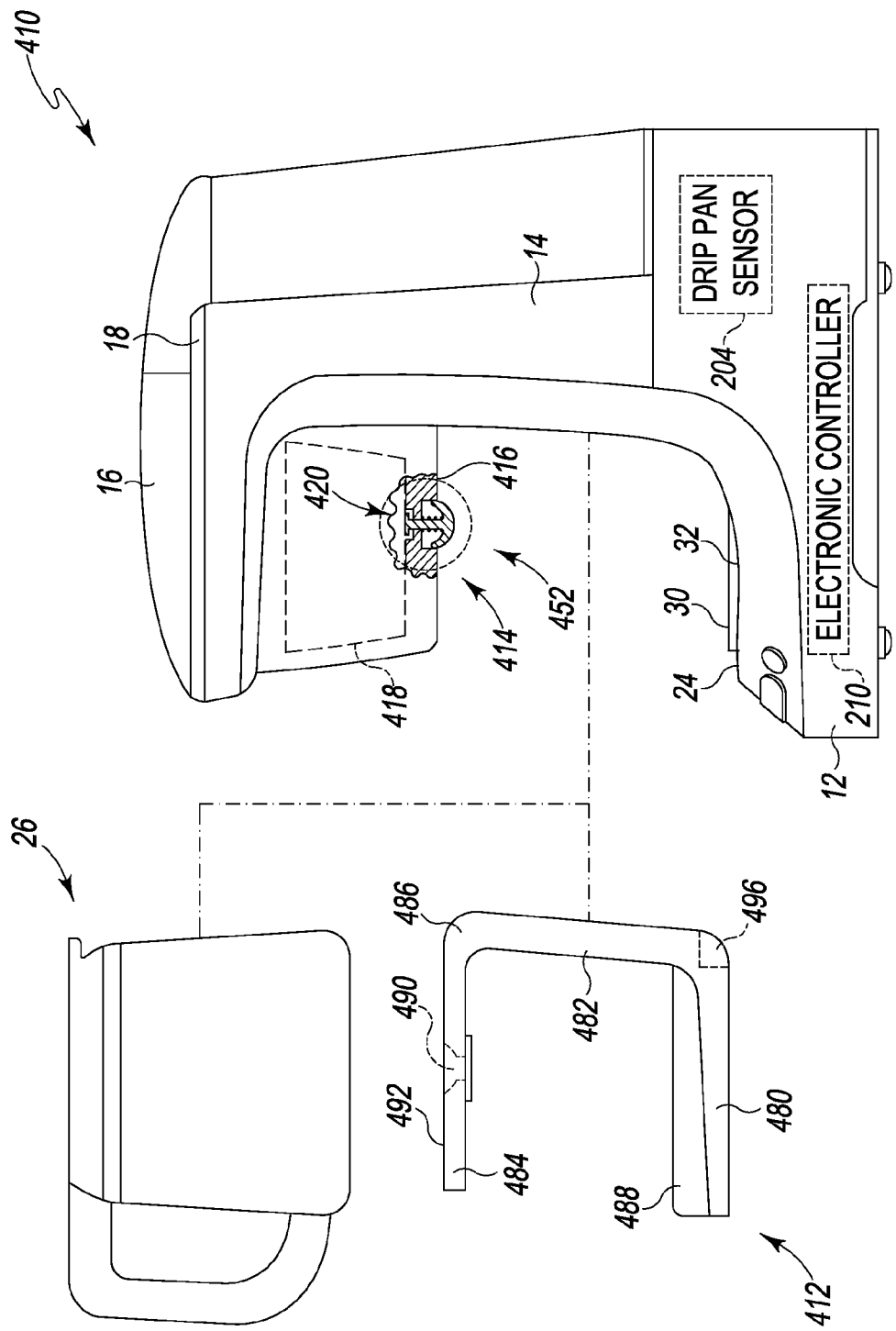
FIG. 7 is a side elevation view of another embodiment of a coffee maker with a carafe and a removable single-serve adaptor removed.

Referring now to FIG. 6, an illustrative embodiment of a control routine 300 for operating the coffee maker 10 is shown. When the user first supplies power to the coffee maker 10, the controller 210 enters an idle state 302 before executing an initialization step 304 in which the controller 210 checks the status of the sensors 202, 204 and the other components of the coffee maker 10. At the completion of the initialization process, the controller 210 is ready to operate the coffee maker 10, and the routine 300 advances to step 306.

In step 306, the controller 210 determines whether the drip pan 28 is positioned on the heating plate 30. To do this, the controller 210 compares the electrical output signal generated by the drip pan sensor 204 with an expected value stored in the memory device 214. When the controller 210 determines that the drip pan 28 is present on the heating plate 30 and the base 12, the controller 210 generates a pan-present signal and routine 300 advances to step 308. When the controller 210 determines that the drip pan 28 is absent from the heating plate 30, the routine advances to step 310.

In step 308, the controller 210 deactivates the heating plate 30 such that the heating plate 30 does not supply heat to the lower surface 112 of the drip pan 28 positioned thereon. The heating plate 30 remains deactivated as long as the drip pan 28 is positioned on the platform 24. Once the heating plate 30 is deactivated, the routine 300 advances to step 312.

In step 312, the controller 210 operates the screen 60 of the control pad 54 to display an indication that the coffee maker 10 is operating in a "Single Serve" mode. In the illustrative embodiment, the screen 60 displays the word "Single" as the indication of the mode. In other embodiments, the indication may take the form of a color change, text change, or other form of visual and/or audio indication to inform the user of the operating mode of the coffee maker 10. The routine 300 then advances to step 314.

In step 314, the controller 210 operates the screen 60 to solicit user input regarding a serving size of coffee to be brewed by the coffee maker 10. The term "serving size" is defined herein as a quantity of coffee associated with a single serving or cup of coffee. Because coffee may be served in cups of varying size, serving sizes also vary from as little as three or four fluid ounces to as much as nine or ten fluid ounces. However, in each case, the amount of coffee that can be contained in each cup would be a single serving of coffee or one serving size. Using a set or select button 220 of the control pad 54, the user may select a serving size from a plurality of serving sizes. Each serving size may be displayed as a numerical value or as a graphic representing a mug, small cup, slight larger cup, and so forth. After the user has selected a serving size, the routine 300 advances to step 316.

In step 316, the controller 210 operates the pump 192 to advance water from the tank 20 to the boiler 200. The water is heated in the boiler 200 and advanced to the shower head 194. The shower head 194 then sprays the heated water into the filter basket 40 and onto any coffee grounds positioned therein. Brewed coffee exits the filter basket 40 through the outlet 50 defined in the bottom wall 46 thereof and is delivered to the cup 182 positioned on the grate 102 of the drip pan 28, as shown in FIG. 4.

In step 318, the controller 210 monitors the amount of coffee delivered to the cup. To do this, the controller 210 communicates with the fluid sensor 202 and compares the electrical output signal generated by the fluid sensor 202 with the expected value associated with the user-selected serving size. If the controller 210 determines the quantity of fluid advanced from the tank 20 is less than the expected value, the controller 210 continues to operate the pump 192. If the controller 210 determines the quantity of fluid advanced from the tank 20 is greater than or equal to the expected value, the routine 300 returns to idle state 302. In the idle state, the controller 210 de-energizes the pump 192.

Returning to step 306, when the controller 210 determines that the drip pan 28 is absent from the heating plate 30, the routine advances to step 310. In step 310, the controller 210 operates the screen 60 to solicit user input regarding the number of multiple servings to be brewed by the coffee maker 10. The term "multiple servings" is defined herein as a quantity of coffee associated with at least two cups or two serving sizes of coffee. In the illustrative embodiment, a number of multiple servings is displayed on the screen 60 after the routine 300 advances to step 310. Using the select button 220, the user may select the number of multiple servings displayed or change the number of servings to increase or decrease the amount of coffee to be brewed.

In step 320, the controller 210 activates the heating plate 30 to supply heat to the carafe 26. In that way, the coffee contained in the carafe 26 is maintained in a warmed state and not allowed to cool. In step 322, the controller 210 operates the pump 192 to advance water from the tank 20 to the boiler 200. The water is heated in the boiler 200 and advanced to the shower head 194. The show head 194 then sprays the heated water into the filter basket 40 and onto any coffee grounds positioned therein. Brewed coffee exits the filter basket 40 through the outlet 50 defined in the bottom wall 46 thereof and is delivered to the carafe 26 positioned on the base 12.

In step 324, the controller 210 monitors the amount of coffee delivered to the carafe 26. To do this, the controller 210 communicates with the fluid sensor 202 and compares the electrical output signal generated by the fluid sensor 202 with the expected value stored in the memory device 214 associated with the user-selected number of multiple servings. If the controller 210 determines the quantity of fluid advanced from the tank 20 is less than the expected value, the controller 210 continues operating the pump 192. If the controller 210 determines the quantity of fluid advanced from the tank 20 is greater than or equal to the expected value, the routine 300 advances to step 324.

In step 326, the controller 210 de-energizes the pump 192. The heating plate 30 remains active to supply heat to the carafe 26. The controller 210 continues to operate the heating plate 30 for a period of time after the pump has been de-energized. After that period of time has expired, the routine 300 returns to the idle state 302.

Referring now to FIGS. 7-13, additional embodiments of a coffee maker appliance are illustrated. Some features of the embodiments illustrated in FIGS. 7-13 are substantially similar to those discussed above in reference to the embodiment of FIGS. 1-6. Such features are designated in FIGS. 7-13 with the same reference numbers as those used in FIGS. 1-6.

Referring now to FIGS. 7-10, another embodiment of a coffee maker appliance (hereinafter referred to as coffee maker 410) is shown. The coffee maker 410 has a base 12 and a housing 14 extending upwardly from the base 12. The housing 14 has an arm 16 that extends outwardly from an upper end 18 parallel to the base 12. The base 12 also includes a platform 24 positioned under the arm 16 that selectively receives a carafe 26 or a removable single-serve adaptor 412. The platform 24 has an upper surface 32 with a heating plate 30 positioned therein.

A filter basket 414 is attached to the arm 16 of the coffee maker 410 above the heating plate 30. The filter basket 414 includes a bottom wall 416 that cooperates with a number of side walls (not shown) to define a filter chamber 418 sized to receive a coffee filter 48. The bottom wall 416 of the basket 414 has an outlet 420 defined therein that permits fluid to advance from the coffee maker 410 to the carafe 26 or a cup (see FIG. 10) positioned in the removable single-serve adaptor 412. The filter basket 414 also includes a drip stop assembly 452 that is configured to regulate the flow of fluid out of the outlet 420.

Figure 8:
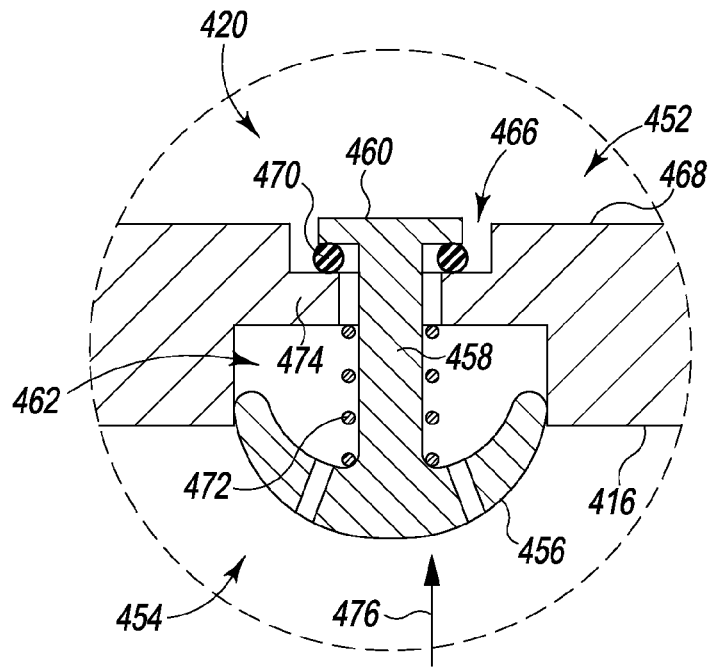
FIG. 8 is a partial cross-sectional view of a drip stop assembly of the coffee maker of FIG. 7.
Figure 9:
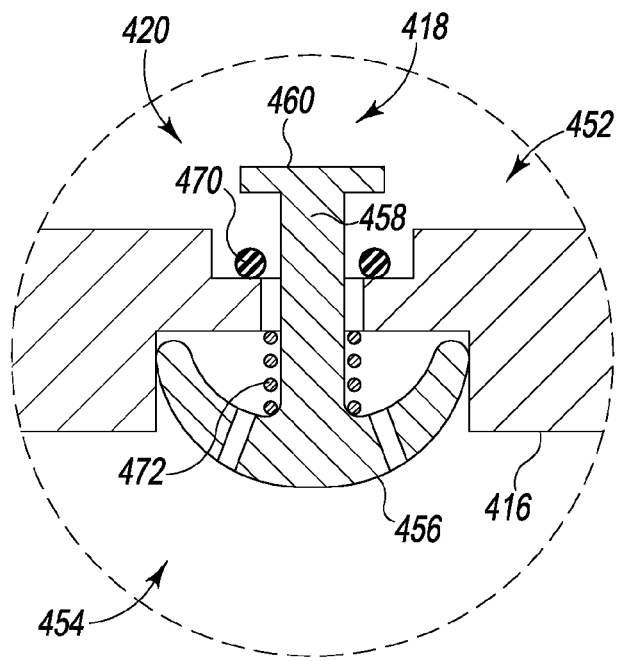
FIG. 9 is another partial cross-sectional view of the drop stop assembly of the coffee maker of FIG. 7.

Referring now to FIGS. 8 and 9, the drip stop assembly 452 includes a plug 454 that is sized to substantially seal the outlet 420 of the filter basket 414. In that way, when the plug 454 is positioned as shown in FIG. 8, the plug 454 prevents fluid from advancing through the outlet 420. As shown in FIG. 9, the plug 454 may be spaced apart from the outlet 420 such that fluid is permitted to advance through the outlet 420.

The plug 454 of the drip stop assembly 452 includes a contact plate 456, a cover plate 460, and a stem 458 positioned therebetween. As shown in FIG. 8, the contact plate 456 is positioned in a slot 462 defined in a lower surface 474 of the bottom wall 416 of the filter basket 40 while the cover plate 460 is positioned in a slot 466 defined in an upper surface 468 of the bottom wall 416. The stem 458 of the plug 454 extends through the outlet 420 to connect the plates 456, 460 together. The basket 414 includes a gasket 470 positioned adjacent to the outlet 420. The cover plate 460 is configured to engage the gasket 470 to seal or close the outlet 420.

The drip stop assembly 452 also includes a biasing element, such as, for example, a spring 472 that is positioned between the contact plate 456 and the bottom 474 of the slot 462 of the bottom wall 416. The spring 472 is configured to bias the plug 454 in the closed position shown in FIG. 8.

The drip stop assembly 452 is actuated by applying force to the contact plate 456 of the plug 454 in the direction indicated by arrow 476. To do so, the user may place the carafe 26 on the platform 24, thereby bringing the lid 80 of the carafe 26 into contact with the contact plate 456 of the plug 454. When the carafe 26 is properly positioned, the plug 454 is advanced upward and the cover plate 460 is moved out of contact with the gasket 470 to the open position shown in FIG. 9. When the drip stop assembly 452 is in the open position, fluid is permitted to advance through the outlet 420, downward through a slot (not shown) defined in the contact plate 456, and into the carafe 26.

Returning to FIG. 7, the coffee maker 410 also includes the removable single-serve adaptor 412 that is configured to actuate the drip stop assembly 452 when positioned on the platform 24. The removable single-serve adaptor 412 has a base 480 and a housing 482 extending upwardly from the base 480. An arm 484 extends outwardly from an upper end 486 of the housing 482 parallel to the base 480. The base 480 includes an integrated drip pan 488, which is configured to receive, for example, spilt fluid.

Figure 10:
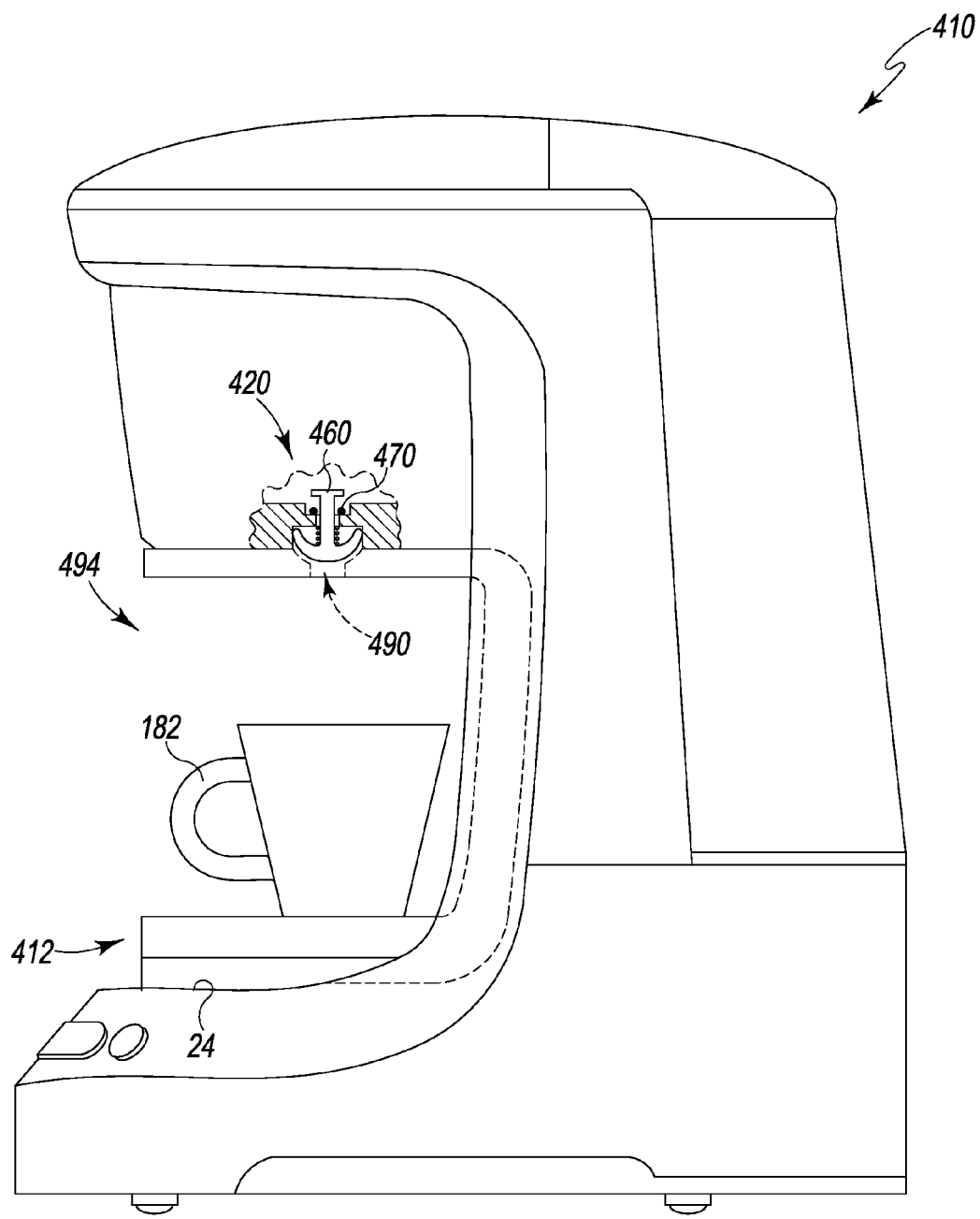
FIG. 10 is a cross-sectional side elevation view of the coffee maker of FIG. 7 with the removable single-serve adaptor positioned thereon.

The removable single-serve adaptor 412 also includes a through slot 490 that is positioned below the outlet 420 when the removable single-serve adaptor 412 is positioned on the platform 24 of the coffee maker 410. As shown in FIG. 10, an upper surface 492 of the arm 484 engages the contact plate 456 of the plug 454 when the removable single-serve adaptor 412 is positioned on the platform 24, thereby pushing the contact plate 456 upward. When the removable single-serve adaptor 412 is positioned as shown in FIG. 10, the cover plate 460 is moved out of contact with the gasket 470. Fluid is thereby permitted to advance through the outlet 420, downward through the slot in the cover plate 456, through the slot 490, and into a cup 182 positioned in a chamber 494 defined between the base 480 and the arm 484. As shown in FIGS. 7-10, the removable single-serve adaptor 412 prevents the user from inserting the carafe 26 into the coffee maker 410 when the removable single-serve adaptor 412 is positioned on the platform 24.

The coffee maker 410, like the coffee maker 10 of FIGS. 1-6 also includes a drip pan sensor 204 positioned in the base 12. The drip pan sensor 204 is a magnetic sensor that provides an indication of the presence of the removable single-serve adaptor 412 on the heating plate 30 of the base 12. In the illustrative embodiment, the base 480 of the removable single-serve adaptor 412 includes a section 496 formed from a metallic material. Because the section 496 is formed from a metallic material, the sensor 204 is operable to detect the removable single-serve adaptor 412 when it is positioned on the platform 24 and generate an electrical output signal indicative of the presence of the removable single-serve adaptor 412. An electronic controller 210 of the coffee maker 410 is configured to receive the electrical output signal and deenergize the heating plate 30 when the removable single-serve adaptor 412 is positioned on the platform 24.

It should be appreciated that other filter basket designs may be used with the coffee maker appliances discussed above. For example, referring now to FIGS. 11 and 12, another embodiment of a filter basket (hereinafter filter basket 540) for use with the coffee maker 410 is shown. As described below, the filter basket 540 may be reconfigured for single serving or multiple serving use without the removable single-serve adaptor 412.

Figure 11:
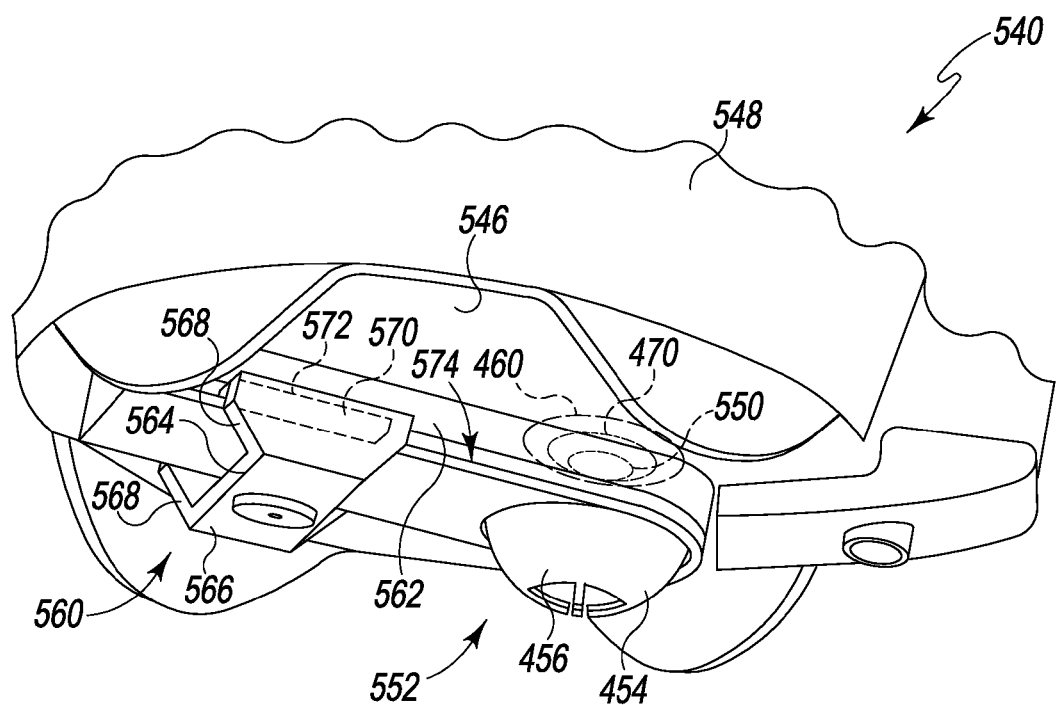
FIG. 11 is a bottom perspective view of another embodiment of a filter basket for use with the coffee maker of FIG. 7.

As shown in FIG. 11, the filter basket 540 may be attached to the arm 16 of the coffee maker 410. The filter basket 540 includes a bottom wall 546 that cooperates with a number of side walls 548 to define a filter chamber (not shown) sized to receive a coffee filter. The bottom wall 546 of the basket 540, like the basket 414 described above in regard to FIGS. 7-10, has an outlet 550 defined therein that permits fluid to advance from the coffee maker 410 to the carafe 26 or a cup 182. The basket 540 also includes a drip stop assembly 552 that is configured to regulate the flow of fluid out of the outlet 550.

Figure 12:
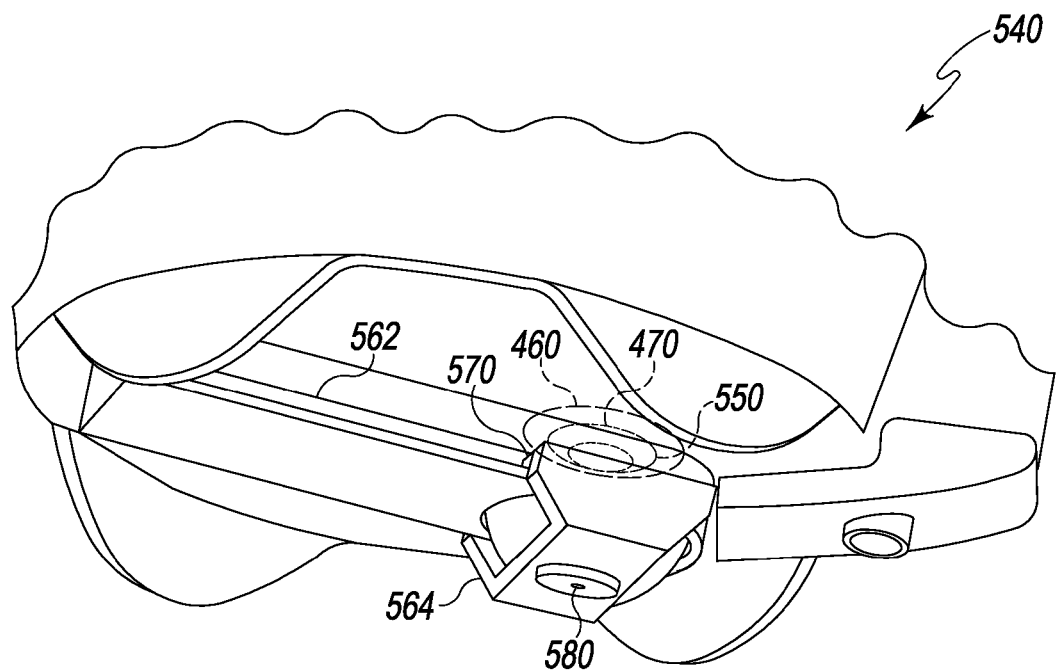
FIG. 12 is another bottom perspective view of the filter basket of FIG. 11.

The drip stop assembly 552, like the drip stop assembly 452 of FIGS. 7-10, includes a plug 454 that is sized to substantially seal the outlet 420 of the filter basket 414. The plug 454 of the drip stop assembly 452 includes a contact plate 456, a cover plate 460, and a stem (not shown) positioned therebetween. When the plug 454 is positioned as shown in FIG. 11, the cover plate 460 engages the gasket 470 to seal or close the outlet 550, thereby preventing fluid from advancing through the outlet 550. As shown in FIG. 12, the cover plate 460 may be moved upward and spaced apart from the outlet 550 such that fluid is permitted to advance through the outlet 550.

The filter basket 540 also includes a funnel assembly 560 configured to be selectively positioned under the plug 454, as shown in FIG. 12. The funnel assembly 560 includes a pair of walls 562 extending downwardly from the bottom wall 546 of the basket 540 and a funnel body 564. The funnel body 564 includes a base 566 and a pair of arms 568 extending upwardly from the base 566. Each arm 568 includes a flange 570 extending parallel to the base 566 from an upper end 572 thereof. Each flange 570 is received in a corresponding track 574 defined in one of the walls 562 such that the funnel body 564 may slide along the tracks 574 from the position shown in FIG. 11 to the position shown in FIG. 12.

When the filter basket 540 is attached to the arm 16 of the coffee maker 410, the plug 454 of the filter basket 540 may be moved to the open position by placing a carafe 26 on the platform 24 or by positioning the funnel assembly 560 under the plug 454. When the carafe 26 is utilized, the funnel body 564 is positioned as shown in FIG. 11, and the lid 80 of the carafe 26 may be advanced into contact with the contact plate 456. Similar to the filter basket 414 of FIGS. 7-10, the carafe 26 causes the contact plate 456 to advance the plug 454 upward, thereby moving the cover plate 460 out of contact with the gasket 470. In that way, the plug 454 is positioned in the open position and fluid is permitted to flow through the outlet 550.

Alternatively, the plug 454 may be moved to the open position by the funnel assembly 560. To do so, the user may slide the funnel body 564 along the tracks 574 from the position shown in FIG. 11 to the position shown in FIG. 12. In that position, the base 566 of the funnel body 564 engages the contact plate 456 to advance the plug 454 upward and move the cover plate 460 to the open position. As shown in FIG. 12, an opening 580 defined in the funnel body 564 is positioned below the outlet 550 when the funnel body 564 is properly positioned. Fluid is then permitted to advance through the outlet 550 and the contact plate 456, downward through the opening 580 of the funnel body 564, and into, for example, a cup (not shown) positioned below the outlet 550.

When the filter basket 540 is utilized with the coffee maker 410, a drip pan 28 may be positioned on the platform 24 to collect fluid spilt from the cup. As a result, the removable single-serve adaptor 412 may be omitted from coffee maker 410.

Figure 13:
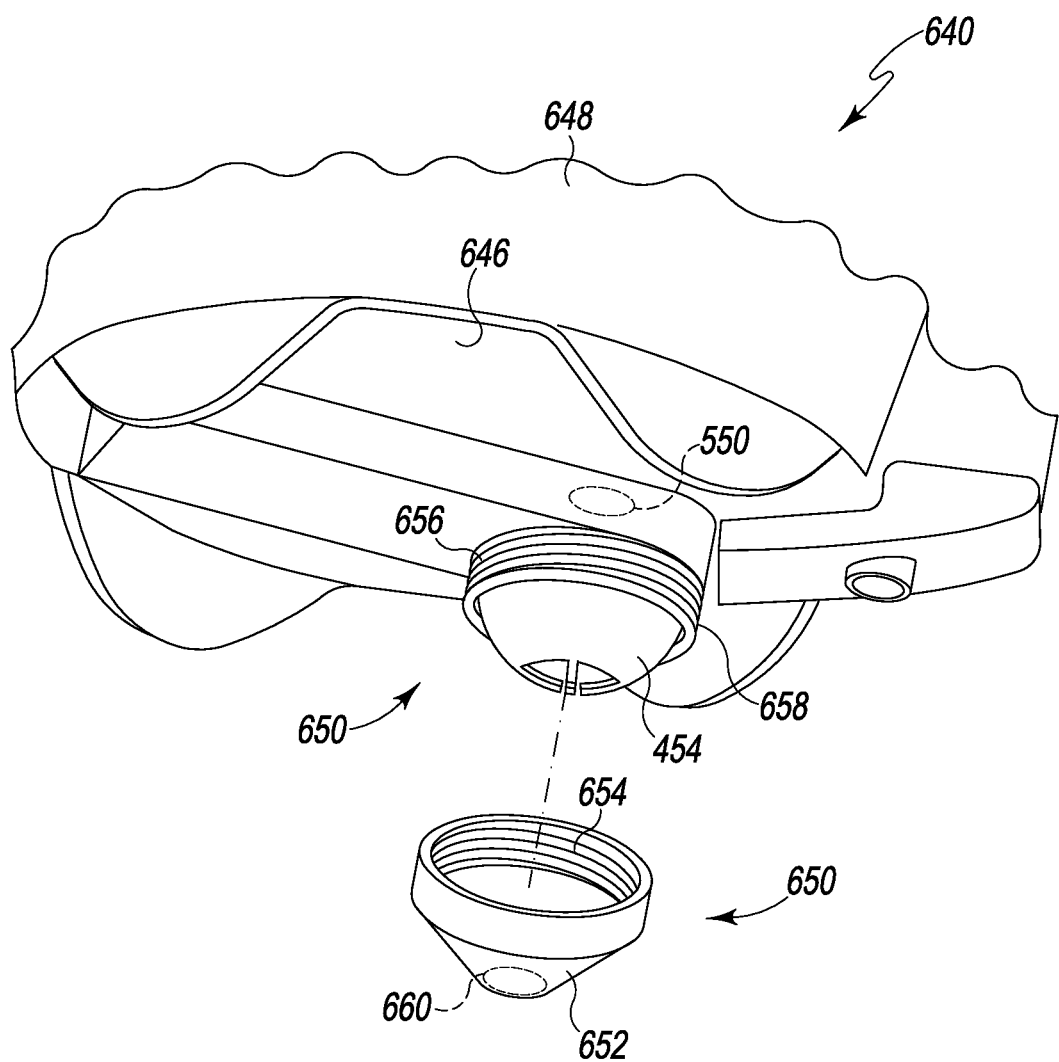
FIG. 13 is a bottom perspective view of another embodiment of a filter basket for use with the coffee maker of FIG. 7.

Referring now to FIG. 13, another embodiment of a filter basket (hereinafter filter basket 640) for use with the coffee maker 410 is shown. As described below, the filter basket 640 may be reconfigured for single serving or multiple serving use without the removable single-serve adaptor 412. The filter basket 640 may be attached to the arm 16 of the coffee maker 410. The filter basket 640 includes a bottom wall 646 that cooperates with a number of side walls 648 to define a filter chamber (not shown) sized to receive a coffee filter. The bottom wall 646 of the basket 640, like the basket 540 discussed above in regard to FIGS. 11 and 12, has an outlet 550 defined therein that permits fluid to advance from the coffee maker 410 to the carafe or a cup. The basket 640 also includes a drip stop assembly 552 that is configured to regulate the flow of fluid out of the outlet 550.

The basket 640 includes a funnel assembly 650 configured to be selectively positioned under a plug 454 of the drip stop assembly 552. As shown in FIG. 13, the funnel assembly 650 includes a conical funnel body 652 configured to be coupled to the filter basket 640. In the illustrative embodiment, the funnel body 652 has an internally-threaded inner surface 654. The bottom wall 646 of the filter basket 640 includes a cylindrical port 656 having an externally-threaded outer surface 658 extending downwardly therefrom. The internally-threaded inner surface 654 of the funnel body 652 is configured to threadingly engage the threaded outer surface 658 of the cylindrical port 656. It should be appreciated that in other embodiments the funnel body 652 and the port 656 may include any combination of tabs, flanges, slots, and tracks to secure the funnel body 652 to the filter basket 640.

A user may move the plug 454 of the drip stop assembly 552 to the open position by threading the funnel body 652 onto the port 656. As the funnel body 652 is advanced upward along the port 656, the plug 454 is also advanced upward to the open position. When the drip stop assembly 452 is in the open position, fluid is permitted to advance through the outlet 550, downward through an opening 660 defined in the conical funnel body 652, and into, for example, a cup (not shown) positioned below the outlet 550. When the funnel body 652 is secured to the port 656, the carafe of the coffee maker 410 is prevented from being positioned on the platform 24.

When the filter basket 640 is utilized with the coffee maker 410, a drip pan 28 may be positioned on the platform 24 to collect fluid spilt from the cup. As a result, the removable single-serve adaptor 412 may be omitted from coffee maker 410.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

For example, it should be appreciated that any of the coffee makers described above may include storage areas for the drip pan 28 and/or other removable components. For example, the support arm 16 of the coffee maker may include a slot or bin that is sized to receive the drip pan 28. The slot or bin may be positioned above the shower head 194 and below the upper surface of the support arm 16. Similarly, in embodiments including a funnel body, the coffee makers may include a slot or bin sized to receive the funnel body.

In other embodiments, the drip stop assembly may be configured to move from a closed position to an open position via a push and turn mechanism. In such embodiments, the user will push the plug of the drip stop assembly upward while rotating the plug to move it to an open position. In other embodiments, the drip stop assembly be include a push-push mechanism in which the plug is moved to an open position by pushing the plug upward until the plug clicks into place.

There are a plurality of advantages of the present disclosure arising from the various features of the method, apparatus, and system described herein. It will be noted that alternative embodiments of the method, apparatus, and system of the present disclosure may not include all of the features described yet still benefit from at least some of the advantages of such features. Those of ordinary skill in the art may readily devise their own implementations of the method, apparatus, and system that incorporate one or more of the features of the present invention and fall within the spirit and scope of the present disclosure as defined by the appended claims.

The invention claimed is:

1. A method of operating a coffee maker, comprising:
determining whether a drip pan is positioned on a base of the coffee maker and generating a pan-present signal in response thereto,
deactivating a heating plate located in a base of the coffee maker when a drip pan is positioned on the base,
soliciting a user-selection of a serving size from a plurality of serving sizes when the drip pan is positioned on the base,
receiving a user-selection of one serving size of the plurality of serving sizes, and
operating a pump to advance fluid to a filter basket in accordance with the user-selection;
wherein the determining step is completed by a controller.

2. A method of operating a coffee maker, comprising:
determining whether a drip pan is positioned on a base of the coffee maker and generating a pan-present signal in response thereto,
operating a user-interface to display a plurality of serving sizes in response to generation of the pan-present signal,
receiving a user-selection of one serving size of the plurality of serving sizes, and
operating a pump to advance fluid to a filter basket in accordance with a user-selection.

3. The method of claim 2, further comprising deactivating a heating plate located in the base in response to generation of the pan-present signal.

4. The method of claim 2, further comprising communicating with a sensor to determine whether the drip pan is positioned on the base.

5. The method of claim 4, wherein the sensor is a magnetic sensor.

6. The method of claim 4, wherein the determining step is completed by a controller.

7. The method of claim 6, further comprising comparing an electrical output from the sensor with a predetermined value.

8. The method of claim 2, further comprising monitoring the amount of fluid advanced to the filter basket.

9. The method of claim 1, further comprising communicating with a sensor to determine whether the drip pan is positioned on the base.

10. The method of claim 9, wherein the sensor is a magnetic sensor.

11. The method of claim 1, further comprising comparing an electrical output from a sensor with a predetermined value.

12. The method of claim 1, further comprising monitoring the amount of fluid advanced to the filter basket.

\* \* \* \* \*